Patented Feb. 10, 1953

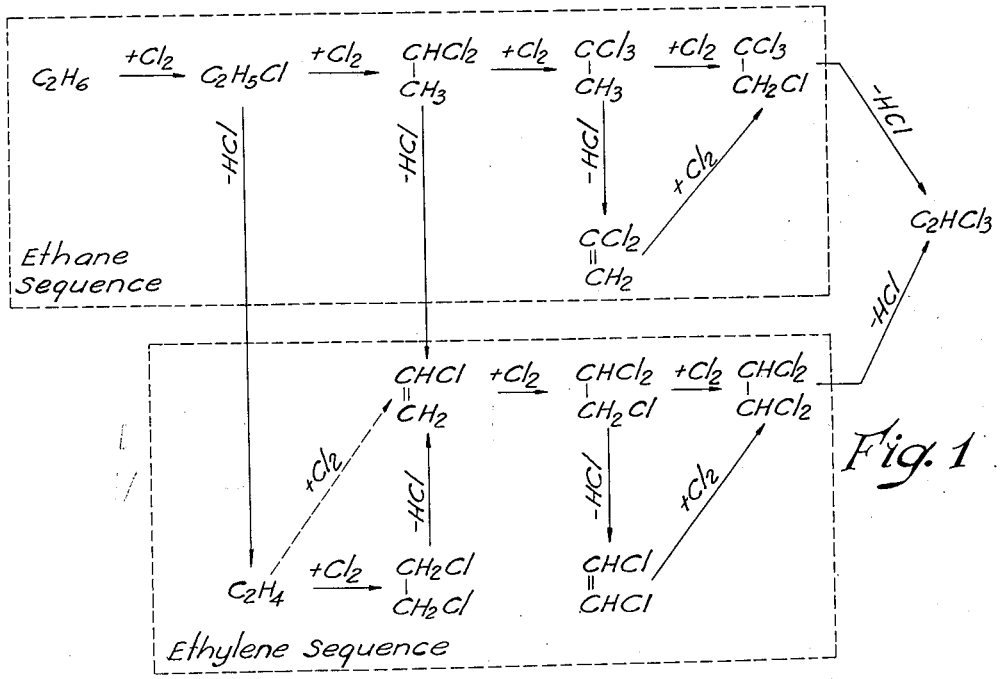
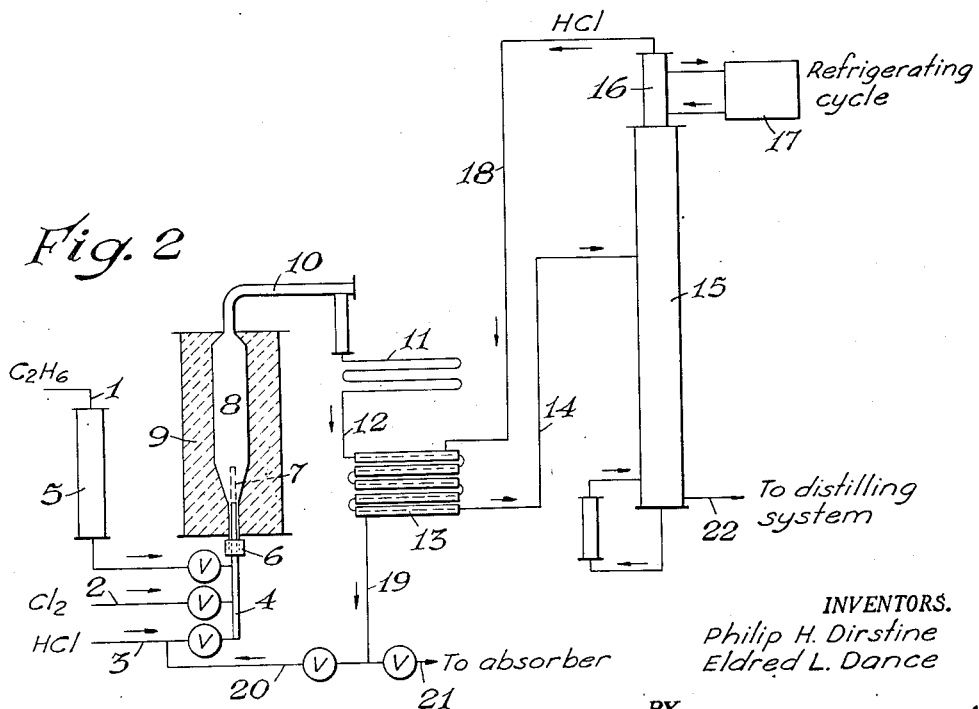

2,628,259

UNITED STATES PATENT OFFICE 2,628,259

PROCESS OF MAKING VINYLIDENE CHLORIDE AND VINYL CHLORIDE

Philip H. Dirstine, Saratoga, and Eldred L. Dance, Pittsburg, Calif., assignors to The Dow Chemical Company, Midland, Mich., a corporation of Delaware Application November 6, 1947, Serial No. 784,476

6 Claims. (Cl. 260—654)

1

The invention relates to a process for the chlorination of ethane or a hydrocarbon gas consisting principally of ethane at elevated temperature under conditions such that the predominant products of the reaction are vinylidene chloride and vinyl chloride.

A particular object of the invention is to provide a process in which vinylidene chloride (1,1-dichloroethylene) can be produced in good yield by the direct chlorination in a single reaction step of a $C_2$ hydrocarbon feed stock. Heretofore vinylidene chloride has been made commercially by the dehydrochlorination of trichloroethane. Trichloroethane is usually made by chlorination of ethylene chloride, and the latter by addition of chlorine to ethylene. Theoretically, vinylidene chloride should be formed in a single reaction step by direct chlorination of ethylene, according to the equation, $$C_2H_4 + 2Cl_2 \rightarrow C_2H_2Cl_2 + 2HCl$$

Such a reaction might be predicted from the prior art, as exemplified by U. S. Patent No. 2,167,927, which describes the thermal chlorination of ethylene by substitution to produce vinyl chloride, and the chlorination of vinyl chloride to produce a mixture of vinylidene chloride and 1,2-dichloroethylene. Actually, however, the yield of vinylidene chloride obtainable by such direct chlorination of ethylene is too low to be commercially feasible, and the concomitant production of a large volume of high boiling polymers or tars would cause too great a waste of the starting materials.

We have now found that a similar thermal chlorination of ethane, under conditions to be described hereinafter, leads to a materially different result, in that vinylidene chloride is produced in good yield, together with vinyl chloride. The invention is described in detail in the following specification, taken in conjunction with the annexed drawing.

In said drawing:

Fig. 1 is a schematic representation of the sequence of reactions and principal products thereof as they occur in the treatment of ethane with chlorine under the conditions of the invention.

Fig. 2 is a diagrammatic flow sheet showing the movement of materials in a preferred embodiment of the process.

According to the invention, the chlorination of ethane by means of gaseous chlorine is so conducted that the principal reaction products are vinylidene chloride and vinyl chloride, to the extent of about 60 to 80 mol per cent, based on the ethane consumed. This result is accomplished by so controlling the reaction conditions that the chlorination of ethane is accompanied by the simultaneous dehydrochlorination of the primary saturated chlorinated ethanes to form corresponding unsaturated derivatives. The essential conditions for securing the above results are: (1) a molar ratio of $Cl_2/C_2H_6$ between 1.9 and 3.0 is maintained; (2) the maximum temperature in the reaction zone is controlled between about 450° and 600° C.; (3) the average residence time of the gases in the reaction zone, calculated at the temperature thereof, is on the order of 0.5 second or more; and (4) an inert diluent gas is admixed with the reaction gases in sufficient volume to control the reaction temperature within the desired range.

In practicing the process a number of saturated and unsaturated chlorinated derivatives of ethane is formed, the particular compounds varying in amount with the temperature and the $Cl_2/C_2H_6$ ratio. We have found, however, that under the conditions of our process, the course of the reaction, although complex, is fairly well defined and leads predominantly to the formation of certain of the possible isomers and derivatives in preference to others.

The dominant reactions and products are indicated schematically in Fig. 1, showing products derived from the reaction of ethane with from 1 to 4 mols of chlorine, the dehydrochlorination products of the primary chlorinated ethanes, and the chlorination products of such dehydrochlorinated derivatives. The progressive chlorination of ethane under the conditions of this invention leads predominantly to the primary formation of unsymmetrical chlorinated ethanes in the following sequence:

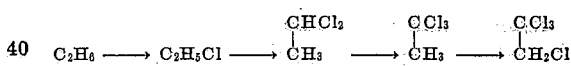

The saturated chloroethanes, as they are successively formed, may be either chlorinated to the next higher degree, or dehydrochlorinated by splitting off HCl to form corresponding unsaturated compounds, which in turn may be chlorinated by addition of chlorine to the double bond, or by substitution, and such products may be again dehydrochlorinated and chlorinated in further stages.

Referring to Fig. 1, ethyl chloride, $C_2H_5Cl$, which represents the first stage of chlorination of ethane, is rarely found in the reaction product of our process, and then only in very small amount. However, ethylene, $C_2H_4$, its dehydrochlorination product, and the chlorinated derivatives of ethylene, are always present, the proportion of ethylene decreasing and that of its chlorinated derivatives increasing as the $Cl_2/C_2H_6$ ratio is increased.

Ethylidene chloride, 1,1-dichloroethane, occurs as a minor component of the reaction product of our process, but its dehydrochlorination product, vinyl chloride, $C_2H_3Cl$, is present in large amount until the $Cl_2/C_2H_6$ ratio approaches close to 3, and the further chlorination products of vinyl chloride are present in increasing amount as the proportion of vinyl chloride in the reaction product decreases.

Methyl chloroform, 1,1,1-trichloroethane, is normally present in small amount, but its dehydrochlorination product, vinylidene chloride, is always found in substantial amount throughout the range of $Cl_2/C_2H_6$ ratios.

Ethylene, which is formed by dehydrochlorination of ethyl chloride, can itself be chlorinated by addition to form ethylene chloride, 1,2-dichloroethane, and the latter is readily dehydrochlorinated in the presence of chlorine to form vinyl chloride. According to one theory that has been advanced elsewhere, ethylene may also be chlorinated by substitution to form vinyl chloride directly, although that theory is based solely on indirect evidence and represents merely a different explanation of the mechanism of reaching an observed result. Ethylene chloride is present in small amount in the reaction products of our process.

The chlorination of vinyl chloride by addition leads to the formation of 1,1,2-trichloroethane, which in turn may be dehydrochlorinated to form principally cis- and trans-1,2-dichloroethylene under the reaction conditions. These compounds are present in the reaction product in small amount, which increases as the $Cl_2/C_2H_6$ ratio increases and as the proportion of vinyl chloride in the product decreases.

Under the conditions of our process small amounts of the tetrachloroethanes and of their dehydrochlorination product, trichloroethylene, are formed, which increase with increasing $Cl_2/C_2H_6$ ratio. Of the former, the unsymmetrical 1,1,1,2-tetrachloroethane is derived directly from chlorination of ethane, while the symmetrical 1,1,2,2-tetrachloroethane is derived indirectly from ethylene. Within the range of conditions for the process, the amount of trichloroethylene increases under specific conditions which cause a decrease in yield of vinyl chloride.

Thus, as indicated in Fig. 1, there are two major reaction sequences in our process, which are set off by broken line rectangles identified, respectively, as the "ethane sequence" and the "ethylene sequence." The principal product of the ethane sequence is vinylidene chloride, which is formed by dehydrochlorination of 1,1,1-trichloroethane. In the ethylene sequence the principal product is vinyl chloride, which may be formed from 1,1-dichloroethane by dehydrochlorination, or from ethylene by chlorination to ethylene chloride and dehydrochlorination of the latter, or by substitution chlorination of ethylene. To the extent that a maximum yield of vinylidene chloride is desired, vinyl chloride may be regarded as a product of side reactions deriving from the splitting off of HCl from a portion of the ethyl chloride and ethylidene chloride primarily formed. Vinyl chloride is not converted to any substantial extent to vinylidene chloride by chlorination.

Mixtures of ethane and ethylene can also be used in our process, if ethane constitutes more than 50 per cent of the feed gas mixture, although with a slightly lower yield of vinylidene chloride. When ethylene is present in the feed gas, the volume ratio of chlorine to hydrocarbon should be adjusted in accordance with the relative combining proportions of chlorine with ethane or ethylene to form derivatives having the same degree of chlorination. Ethylene requires theoretically one less mol of chlorine than does ethane to form chlorinated ethane derivatives containing the same number of chlorine atoms, as shown by the equations;

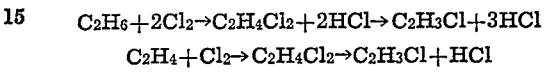

$$C_2H_4+Cl_2 \rightarrow C_2H_4Cl_2 \rightarrow C_2H_3Cl+HCl$$

and

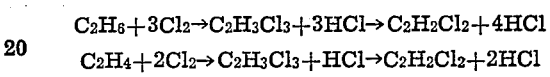

$$C_2H_4+2Cl_2 \rightarrow C_2H_3Cl_3+HCl \rightarrow C_2H_2Cl_2+2HCl$$

Thus, in our process, when a mixture of ethane and ethylene is used as feed gas, the mol ratio of chlorine to hydrocarbon is from 1.9 to 3.0 for the ethane content of the feed, and from 0.9 to 2.0 for the ethylene content. This may be expressed by the formula, mols $Cl_2 = x \cdot$ mols $C_2H_6 + (x-1) \cdot$ mols $C_2H_4$, where $x=$ a value from 1.9 to 3.0.

As a comparison of the yields obtainable by chlorinating ethane, ethylene and a mixture thereof under the conditions of the invention, three series of runs were made using, respectively, (1) ethylene, (2) a mixture of one part by volume of ethylene and two parts of ethane, and (3) ethane, as the feed gas. The volume of chlorine in each case corresponded to an $x$ value of 2.7 in the above formula. The feed gas was diluted with a sufficient volume of steam to maintain the reaction temperature at a maximum of about 530° C. The average of several runs with each feed gas is shown in the following Table I with respect to yields of vinylidene chloride and vinyl chloride based on the hydrocarbon gas in the feed.

TABLE I

| Feed Gas | Percent Yield | | |
|---|---|---|---|
| | Vinyl Chloride | Vinylidene Chloride | Total |
| $C_2H_4$ | 36.6 | 12.7 | 49.3 |
| $1C_2H_4/2C_2H_6$ | 29.6 | 34.4 | 64.0 |
| $C_2H_6$ | 25.8 | 41.4 | 67.2 |

The large increase in yield of vinylidene chloride, as well as in the total yield of vinylidene chloride plus vinyl chloride, with a feed gas consisting principally of ethane, is clearly shown.

In our process, chlorine and ethane, if reacted in the stated proportions of 1.9 to 3 mols of $Cl_2$ to 1 mol $C_2H_6$, would liberate considerably more heat than is required to raise the temperature of the gases to the prescribed range of 450° to 600° C., with consequent decomposition of the hydrocarbon and its chlorinated derivatives and formation of free carbon. To prevent such overheating and decomposition, the reaction gases are mixed with an inert diluent gas or vapor in sufficient proportion to control the reaction temperature within the desired range. Examples of suitable diluents are nitrogen, steam, hydrogen chloride, carbon tetrachloride, perchlorethylene. The volume of the diluent has no fixed relation to the volumes of chlorine and ethane, but varies in accordance with the $Cl_2/C_2H_6$ ratio, the temperature of the feed gases, the temperature to be maintained in the reaction zone, the radiation characteristics of the reactor, and the specific heat of the particular diluent. The proportion of diluent to be used in a particular case is determined empirically with regard to the above controlling factors. While it may vary considerably from case to case, generally speaking the volume of diluent is greater than the sum of the volumes of chlorine and hydrocarbon. When the volume of diluent has been determined for a particular set of conditions, the diluent may be employed to vary the temperature of the reaction zone within the prescribed limits by variation of the feed rate of the diluent.

The process of the invention is operated without the use of a catalyst.

Preferred conditions of operation within the limits already stated provide a $Cl_2/C_2H_6$ ratio between 2.3 and 2.7, a temperature between 500° and 550° C., and a residence time in the reaction zone of about 1 to 1.5 seconds, although a longer time does not materially change the results. The preferred diluent is hydrogen chloride, which is formed in the reaction and can be separated from the reaction products and recycled in the amount required to maintain the desired temperature.

Our process is particularly characterized by yielding vinylidene chloride as a major constituent of the reaction product. In addition, some of the minor constituents of the reaction product are readily convertible to vinylidene chloride. Both ethylidene chloride, $1,1$-$C_2H_4Cl_2$, and methyl chloroform, $1,1,1$-$C_2H_3Cl_3$, when separated from the reaction product, may be recycled to increase the yield of vinylidene chloride. Ethylidene chloride, when added to the feed materials, is convertible into vinyl chloride and vinylidene chloride in about the same proportions as is ethane. When recycling ethylidene chloride, the amount of chlorine in the feed is preferably to be adjusted to allow for the equivalent chlorine content (2 mols) of this compound. For example, if the $Cl_2/C_2H_6$ ratio is to be maintained at, say, 2.5/1, for every mol of ethylidene chloride recycled, 0.5 mol of chlorine would be added to the feed to maintain the same balance between chlorine and hydrocarbon in the process. Methyl chloroform, when recycled in the process, is convertible directly to vinylidene chloride by splitting off HCl. On the other hand, recycling vinyl chloride does not materially increase the yield of vinylidene chloride, but does increase the yield of other products, as explained above, at the expense of vinyl chloride, and is, therefore, economically disadvantageous.

When hydrogen chloride is separated from the reaction product and a portion of it is recycled in the process as diluent, the ethylene in the reaction product normally accompanies it and is likewise recycled to the same extent, unless removed by special treatment. If the process is carried out in the range of preferred conditions, the amount of ethylene in the product is small, and recycling a portion of it does not significantly affect the materials balance of the process. In larger amounts, however, as already shown, the presence of ethylene in the feed, either as recycle or admixed with the ethane supply, will reduce the proportion of vinylidene chloride and increase that of vinyl chloride in the reaction product.

A preferred embodiment of our process may be explained by reference to the flow diagram in Fig. 2. The feed materials, ethane, chlorine and the diluent (HCl), are introduced through lines 1, 2 and 3, respectively, which join in a header pipe 4. In line 1 is shown a preheater 5, which is used in starting the operation and may be optionally used during operation. Header 4 is connected by means of a slip joint 6 with feed pipe 7, which is adjustable as to the length by which it projects into reaction chamber 8. Chamber 8 is lined with refractory material, such as graphite slabs, and is heavily lagged with insulation 9 to reduce radiation losses. The volume of chamber 8 is so proportioned with respect to the capacity of feed pipe 6 that a residence time of at least 0.5 second is provided at the designed feed rate of the reaction gases at reaction temperature. The exit gases from chamber 8 pass through outlet pipe 10 to a water cooler 11, and thence by line 12 to a heat exchanger 13. The cooled gases, at a temperature of about —10° to —15° C. are conducted by line 14 to an intermediate point in fractionating column 15, where liquefiable products are condensed and separated from the permanent gases, which consist substantially of hydrogen chloride and ethylene. The off-gases from the top of column 15 pass through a refrigerated reflux head 16, cooled by a refrigerant supplied from refrigerating cycle 17. The overhead gases, at a temperature of about —70° to —80° C., pass through line 18 to the jacket of exchanger 13, whereby they serve to cool the reaction gases, and thence are discharged through line 19. Line 19 connects with branch lines 20 and 21, of which line 20, connecting with diluent feed line 3, carries a sufficient volume of the gases to serve as diluent feed for the reactor. The remainder of the gases in line 19 is conducted through line 21 to an absorber system for absorbing the gas in water or to other point of use. The liquid condensate of chlorinated ethane derivatives in column 15 is removed as a bottom stream through line 22 to a distilling system for separation of individual products by usual means.

For starting operation of the process, the ethane supply may be turned on first, the gas passed through preheater 5, wherein it is preheated to about 300° to 400° C., and the preheated gas passed through reaction chamber 8 until the latter is heated to a temperature of about 300° C., sufficient to initiate reaction of ethane and chlorine. Then the chlorine supply is gradually turned on to start the reaction and heat up chamber 8 to the desired operating temperture. During the heating-up period the flows of ethane, chlorine and diluent (HCl) are adjusted to the required ratios for continued operation within the desired temperature range, and the heat supply to preheater 5 is turned off when steady operating conditions are established. The reaction in chamber 8 may be made thermally self-sustaining by limiting radiation losses to a low value. A close adjustment of temperature to stabilize the reaction zone within the chamber 8 may be made by varying the rate of mixing of the inlet gases with the hot reaction gases. This may be done by varying the length of the adjustable feed pipe 7 within the chamber, as indicated by the broken line extension of pipe 7. The higher the pipe extends within the chamber, the greater the rate of mixing.

The temperature of the reaction zone, as referred to in the following examples, is taken as the maximum temperature at any point in the reaction chamber, as measured by thermocouples (not shown) which are disposed at a sufficient number of points in the chamber to furnish an accurate temperature traverse thereof. Under steady operation a zone of maximum temperature establishes itself in the reactor, which does not vary or shift greatly under normal conditions.

The following examples are representative of the results obtained in practicing the invention.

Example 1

Ethane, chlorine and steam were premixed and passed into a reactor 3 inches in diameter and 20 inches long in proportions by volume of 5.2 parts $C_2H_6$, 14.4 parts $Cl_2$ and 43 parts steam, measured in gram mols per hour. The maximum temperature in the reactor was maintained at approximately 540° C., and the average residence time of the gases in the reactor was calculated as approximately 2 seconds. The reactor exit gases were scrubbed with water to remove HCl and steam, and the liquefiable chlorinated compounds were condensed and distilled to separate the products. The yield, in mol per cent of ethane used, was: vinyl chloride—27.4 per cent, vinylidene chloride—35.7 per cent, cis- and trans-1,2-dichloroethylene—5.0 per cent.

Example 2

A series of runs was made in a reactor 4 inches in diameter by 48 inches long, provided with an auxiliary electric heat to regulate temperature in part independently of the volume of reacting gases and diluent. Ethane, chlorine and steam were mixed and passed into the reactor at the flow rates, in gram mols per hour, shown, respectively, in the first three columns of Table II. The fourth column shows the approximate maximum temperature in the reactor. The fifth column shows the average residence time of the gases in the reactor, which was varied by varying the amount of diluent. The last three columns show the yield, in mol per cent of ethane used, of vinyl chloride, vinylidene chloride and 1,2-dichloroethylenes. At the relatively long reaction times of these runs, the yield of vinyl chloride and vinylidene chloride is not greatly affected by varying the time.

TABLE II

| | $C_2H_6$ | $Cl_2$ | $H_2O$ | Temp. | Time (sec.) | $C_2H_3Cl$ | 1,1-$C_2H_2Cl_2$ | 1,2-$C_2H_2Cl_2$ |
|---|---|---|---|---|---|---|---|---|
| 1 | 3.5 | 9.5 | 37 | 460 | 11.8 | 33.8 | 36.2 | 5.8 |
| 2 | 3.5 | 9.5 | 65 | 487 | 7.3 | 32.6 | 37.6 | 3.9 |
| 3 | 3.5 | 9.5 | 80 | 470 | 6.2 | 29.0 | 36.0 | 5.3 |

Example 3

Into a reactor 1½ inches in diameter by 20 inches long, maintained at a maximum temperature of approximately 570° C. by the heat of reaction, a mixture of chlorine, ethane and nitrogen was introduced at the rate of 7.75 gram mols $Cl_2$, 2.8 mols $C_2H_6$ and 34 mols $N_2$ per hour. The ratio of $Cl_2/C_2H_6$ was 2.77, and the average residence time of the gases in the reactor was approximately 0.69 second. The reaction products were continuously removed at the end of the reactor opposite to the feed gas inlet, scrubbed with water to remove HCl, and passed to a condenser column provided with a refrigerated head. The head temperature of the condenser was adjusted to pass an overhead gas stream consisting of $N_2$, a small amount of $C_2H_4$ and a portion of the vinyl chloride, which was recycled to supply the diluent for the feed gases. The remainder of the vinyl chloride and the higher-boiling chlorinated products was condensed and distilled to separate the products. The yield of products recovered, expressed as mol per cent of the $C_2H_6$ used, was: vinyl chloride—11.8 per cent, vinylidene chloride—40.6 per cent, cis- and trans-1,2-dichloroethylene—16.0 per cent. As compared with the previous examples, the recycle of vinyl chloride resulted in a loss of yield of that compound, with only a small, if any, gain in yield of vinylidene chloride, but with a relatively high yield of 1,2-dichloroethylenes. There was also a higher than normal amount of tarry residue, which probably was mostly composed of polymerization products. This is evidence of the impracticability of recycling vinyl chloride to increase the yield of vinylidene chloride.

Example 4

In a series of runs, mixtures of ethane, chlorine and hydrogen chloride as diluent, in the proportions in pound mols shown in the following Table III, were passed through an insulated reaction chamber lined with graphite, at an average flow rate of 1.99 mols per hour and a pressure of about 5 pounds gauge. The reaction chamber was 7½ inches in diameter and 55 inches long, with a conical portion at the inlet end. The volume of the reactor was 0.5 cubic foot, and at the operating temperature the average residence time of the gases in the chamber was 1.0 to 1.2 seconds. The maximum temperatures maintained by the heat of reaction in the reaction zone for the several runs is shown in the table. The reaction product was cooled and condensed to separate vinyl chloride and higher boiling compounds from the permanent gases. A complete distillation analysis of the gaseous and liquid fractions of the product of the several runs is given in the table, in which the value shown for HCl is obtained after deducting the amount of the diluent.

TABLE III

| No. | Charge, Mols | | | Temp. | Products, Mols | | | | | | | | | | |
|---|---|---|---|---|---|---|---|---|---|---|---|---|---|---|---|
| | $C_2H_6$ | $Cl_2$ | Dil. HCl | | $C_2H_4$ | HCl | $C_2H_3Cl$ | 1,1-$C_2H_2Cl_2$ | 1,2-$C_2H_2Cl_2$ | 1,1-$C_2H_4Cl_2$ | 1,1,1-$C_2H_3Cl_3$ | 1,2-$C_2H_4Cl_2$ | 1,1,2-$C_2H_3Cl_3$ | $C_2HCl_3$ | $C_2H_2Cl_4$ +res. |
| 1 | 100 | 195 | 430 | 517 | 21.6 | 267 | 39.8 | 21.8 | 2.2 | 2.8 | 9.0 | 0.3 | 0.2 | 0.6 | 1.1 |
| 2 | 100 | 198 | 430 | 546 | 20.6 | 270 | 40.6 | 20.6 | 1.8 | 4.0 | 7.0 | 0.5 | | 2.1 | 1.3 |
| 3 | 100 | 208 | 424 | 541 | 11.4 | 312 | 33.1 | 28.7 | 3.2 | 0.4 | 0.6 | 0.2 | 0.6 | 0.8 | 4.0 |
| 4 | 100 | 230 | 472 | 534 | 8.9 | 322 | 35.4 | 32.3 | 3.1 | 1.6 | 3.1 | 0.7 | | 0.5 | 1.4 |
| 5 | 100 | 233 | 505 | 522 | 8.9 | 321 | 33.9 | 34.2 | 6.0 | 0.5 | 0.4 | 0.6 | 0.2 | 2.2 | 8.0 |
| 6 | 100 | 242 | 500 | 409 | 6.0 | 325 | 35.7 | 34.6 | 3.6 | 1.7 | 3.1 | 3.0 | 2.1 | 2.6 | 2.9 |
| 7 | 100 | 250 | 522 | 520 | 4.4 | 340 | 32.8 | 31.3 | 2.4 | 4.7 | 7.7 | 3.1 | 2.1 | 2.6 | 2.9 |
| 8 | 100 | 268 | 550 | 507 | 2.5 | 357 | 19.8 | 33.3 | 6.2 | 2.5 | 2.5 | 3.6 | 7.6 | 5.9 | 9.1 |
| 9 | 100 | 276 | 585 | 490 | 0.9 | 351 | 12.1 | 33.1 | 8.6 | 3.5 | 1.9 | 6.8 | 8.6 | 7.2 | 11.3 |

Referring to the table, the runs made at a mol ratio $Cl_2/C_2H_6$ of less than 2.3/1 shows a relatively high volume of ethylene in the product, indicating substantial dehydrochlorination of ethyl chloride or dehydrogenation of ethane without corresponding chlorination of the ethylene. At $C_2l/C_2H_6$ ratios between 2.3/1 and 2.7/1, the proportion of ethylene in the product is much smaller, and in this range the highest yield of vinylidene chloride (1,1-$C_2H_2Cl_2$) is obtained. At $Cl_2/C_2H_6$ ratios above 2.5/1, the yield of vinyl chloride falls off rapidly, accompanied by an increase in the derivatives of vinyl chloride, e. g. 1,2-dichloroethylenes, 1,1,2-trichloroethane, trichloroethylene, and higher boiling derivatives, but with little falling off in yield of vinylidene chloride. This indicates that under conditions causing conversion of vinyl chlorde to higher boiling derivatives, little or none of it is converted to vinylidene chloride.

*Example 5*

A gaseous mixture was formed which was composed of 65.6 pound mols of ethane, 34.4 mols of ethylidene chloride, 186 mols of chlorine and 274 mols of hydrogen chloride as diluent. The mol ratio of $Cl_2$ equivalent to the sum of $C_2H_6$ and $C_2H_4Cl_2$ in the feed, was 2.55 in accordance with the formula, $$\text{mols } Cl_2 = x \cdot \text{mols } C_2H_6 + (x-2) \cdot \text{mols } C_2H_4Cl_2$$

The mixture was passed through the reactor described in the preceding example at the rate of approximately 1.88 pound mols per hour. The maximum reactor temperature was maintained at approximately 487° C., providing an average contact time for the gas in the reactor of approximately 1.2 seconds. The reaction product was cooled and condensed to obtain gaseous and liquid fractions, and the latter fractionated. There was obtained 30.9 mols of vinyl chloride and 39.8 mols of vinylidene chloride, representing the percentage yield from the total input of 100 mols of ethane plus ethylidene chloride.

When ethylidene chloride is added to the feed gases of the process, each mol thereof is considered equivalent to 2 mols of chlorine, since it is itself the product of reaction of 1 mol ethane with 2 mols of chlorine. In such case the relative volume of chlorine in the fed may be adjusted in accordance with the modified formula, $$\text{mols } Cl_2 = x \cdot \text{mols } C_2H_6 + (x-1) \cdot \text{mols } C_2H_4 + (x-2) \cdot \text{mols } C_2H_4Cl_2$$

where $x$ has the value of 1.9 to 3.0, as before.

*Example 6*

To show the effect of admixing ethylene with the ethane in the feed, two series of runs were made under comparable conditions in a reactor 3 inches in diameter by 20 inches long. In one series (3 runs) with ethane alone a $Cl_2/C_2H_6$ ratio of 2.7 was used. In the other series (4 runs) a mixture of approximately 2 parts of ethane to 1 part of ethylene was used, and the volume of chlorine was the equivalent of that in the first series, according to the formula, $$\text{mols } Cl_2 = x \cdot \text{mols } C_2H_2 + (x-1) \cdot \text{mols } C_2H_4$$

The diluent was steam. The average residence time of the gases in the reactor at reaction temperature was 2.7 seconds. The average results of the two series are shown in Table IV, the feed being expressed in gram mols per hour and the product yield in mol per cent based on the hydrocarbons in the feed.

TABLE IV

| Feed | | | | Temp., °C. | Product | | |
|---|---|---|---|---|---|---|---|
| $Cl_2$ | $C_2H_6$ | $C_2H_4$ | $H_2O$ | | $C_2H_3Cl$ | 1,1-$C_2H_2Cl_2$ | Higher Boiling |
| 9.5 | 3.5 | ---- | 34 | 530 | 25.8 | 41.4 | 13.6 |
| 9.2 | 2.56 | 1.32 | 34 | 530 | 29.6 | 34.4 | 17.1 |

The substitution of ethylene for ethane to the extent of one-third of the hydrocarbon in the feed increased the amount of vinyl chloride and higher boiling compounds in the product at the expense of a somewhat lowered yield of vinylidene chloride.

While the presence of ethylene in the ethane to be used in our process has the effect of lowering the yield of vinylidene chloride, a moderate loss can sometimes be tolerated for economic reasons, if the proportion of ethylene in the feed gas is not too great, for the reason that it may be compensated by the saving in cost of separating the ethylene from the ethane and a higher yield of vinyl chloride. A source of ethane is furnished by petroleum refinery gases, from which a commercial ethane fraction can be separated, which usually contains some ethylene. In general, such refinery gas fraction may be used in our process without too great a sacrifice in yield of vinylidene chloride and other advantages of the process, if the ethylene content thereof is not materially greater than 35 to 40 per cent by volume.

From the examples it is seen that the composition of the reaction product of our process is more affected by changes in the $Cl_2/C_2H_6$ ratio than by variations of other essential conditions within the ranges herein disclosed. Considerable variation of temperature within the limits of 450° to 600° C. is possible without greatly changing the yield of vinylidene chloride and vinyl chloride. If the time factor, as calculated from the gas feed rate at the reaction temperature, is at least 0.5 second, or, for convenience of operation, about 1.0 second, no material advantage in yield of products is gained by further increasing the contact time. The identity of the inert diluent does not materially affect the yield of various products, other conditions being the same, but merely determines the procedure for recovering and separating the reaction products in accordance with known practice.

We claim:

1. A process of making vinylidene chloride and vinyl chloride, which comprises adding chlorine and an inert diluent gas or vapor to a hydrocarbon gas consisting of ethane or a mixture of ethane and ethylene containing more than 50 per cent of ethane, the mol ratio of chlorine to hydrocarbon being in accordance with the formula, $$\text{mols } Cl_2 = x \cdot \text{mols } C_2H_6 + (x-1) \cdot \text{mols } C_2H_4$$

in which $x$ has a value from 1.9 to 3.0, and the volume of the diluent is sufficient to control the subsequent reaction temperature within the prescribed limits under the reaction conditions, passing the gaseous mixture through a reaction zone maintained at a temperature between 450° and 600° C. at a flow rate such as to provide an average residence time of at least 0.5 second for the gases in said zone, and separating vinylidene chloride and vinyl chloride from the reaction product.

2. Process according to claim 1, in which the mol ratio of chlorine to hydrocarbon according to the formula corresponds to a value of $x$ between 2.3 and 2.7.

3. Process according to claim 1, in which the reaction temperature is between 500° and 550° C.

4. Process according to claim 1, in which the inert diluent is hydrogen chloride, which is obtained by separation from the reaction product and recycled in amount required to maintain the reaction temperature within the desired limits.

5. Process according to claim 1, in which ethylidene chloride and methyl chloroform are separated from the reaction product and added to the feed gases, together with additional chlorine in proportion of $x-2$ mols per mol of such ethylidene chloride, to increase the yield of principal products.

6. Process according to claim 1, in which ethylidene chloride is added to the feed gases, together with additional chlorine in proportion of $x-2$ mols per mol of such ethylidene chloride.

PHILIP H. DIRSTINE.
ELDRED L. DANCE.

REFERENCES CITED

The following references are of record in the file of this patent:

UNITED STATES PATENTS

| Number | Name | Date |
|---|---|---|
| 2,034,292 | Grebe et al. | Mar. 17, 1936 |
| 2,167,927 | Groll et al. | Aug. 1, 1939 |
| 2,259,195 | Baehr et al. | Oct. 14, 1941 |